(12) United States Patent
Platt et al.

(10) Patent No.: US 8,054,501 B2
(45) Date of Patent: Nov. 8, 2011

(54) SYSTEM AND METHOD FOR ANALYZING PRINT QUALITY

(75) Inventors: Hugh Gregory Platt, Mississauga (CA); Robert Ian McVey, Toronto (CA); Matthew Lanteigne, Mississauga (CA)

(73) Assignee: Final Print Assurance Inc., Brampton, ON (CA)

( * ) Notice: Subject to any disclaimer, the term of this patent is extended or adjusted under 35 U.S.C. 154(b) by 834 days.

(21) Appl. No.: 11/936,526

(22) Filed: Nov. 7, 2007

(65) Prior Publication Data

US 2009/0116044 A1 May 7, 2009

(51) Int. Cl.
*H04N 1/40* (2006.01)

(52) U.S. Cl. .......................................... 358/1.9; 358/468

(58) Field of Classification Search .................... 358/1.9, 358/2.1, 1.16, 468; 399/9, 15
See application file for complete search history.

(56) References Cited

U.S. PATENT DOCUMENTS

| | | | |
|---|---|---|---|
| 6,178,254 B1 | 1/2001 | Rapette | |
| 6,381,343 B1 | 4/2002 | Davis et al. | |
| 6,707,931 B2 | 3/2004 | Herbert | |
| 2003/0133623 A1* | 7/2003 | Lee et al. | 382/270 |
| 2004/0008358 A1 | 1/2004 | Kiyohara | |
| 2005/0147296 A1* | 7/2005 | Hilton et al. | 382/170 |
| 2007/0024657 A1 | 2/2007 | Zhang et al. | |

FOREIGN PATENT DOCUMENTS

EP 874333 10/1998

* cited by examiner

*Primary Examiner* — Thomas D Lee
*Assistant Examiner* — Stephen M Brinich

(57) ABSTRACT

A method is provided for analyzing the color quality of a press pull as compared to a contract proof. The contract proof is scanned to create image data including color data representing a scanned proof image. The press pull is also scanned to create image data including color data representing a scanned press pull image. The scanned images are simultaneously displayed on a video monitor, and, the displayed images are searched for any significant differences in color. A system is provided for analyzing the color quality of a press pull as compared to a contract proof comprising at least one scanner for scanning the contract proof and for scanning the press pull, an image comparator connected to the at least one scanner to receive the data for the scanned proof image and the scanned press pull image and a video monitor connected to the image comparator to receive the data for the scanned proof image and the scanned press pull image and to display the scanned images simultaneously.

16 Claims, 7 Drawing Sheets

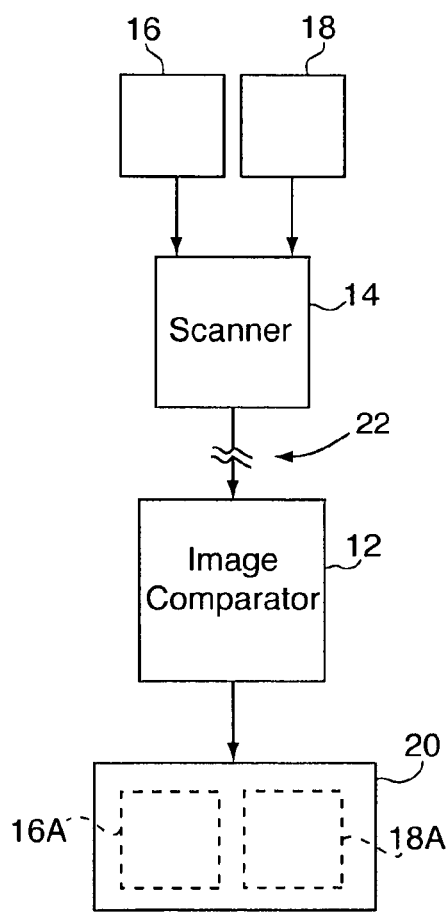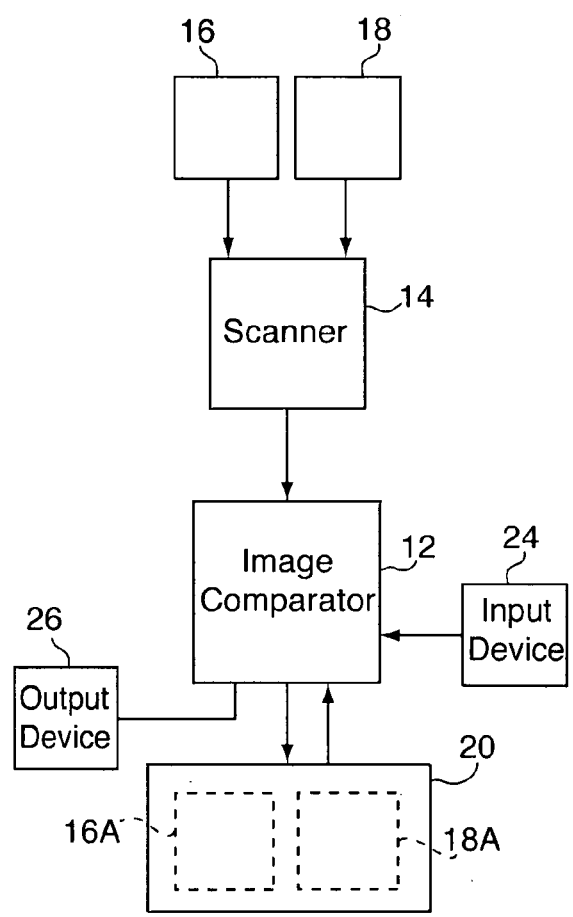

SYSTEM AND METHOD FOR ANALYZING PRINT QUALITY

FIELD OF THE INVENTION

This invention relates to a system and method for analyzing the colour quality of a printed product at the beginning of and during a print run.

BACKGROUND OF THE INVENTION

In the field of commercial colour printing, the printed product should ideally conform as closely as possible to the design as created and visualized by the graphic designer. Because of the complexity of colour printing processes, there are myriad variables which can and will affect the colour and appearance of the printed product and thus, if not accounted for and carefully controlled, yield printed product which does not conform to the graphic designer's vision. Such variables may, for example in a flexography printing process, include:
a. ink properties, such as:
   colour
   viscosity
   opacity/transparency
   interaction of one ink with another (e.g. ink trap)
   ink system used (i.e. the physical ingredients used in the ink emulsion selected according to the application—e.g. ingredients or additives to provide UV resistance)
   which can all affect the spread and appearance of the ink on a print substrate (e.g. paper, cardboard, plastic, all of various types). Ink properties can change from supplier to supplier, from batch to batch, according to environmental conditions, or even with the passage of time.
b. substrate properties, such as:
   colour
   absorbency
   porosity
   surface finish
   which can all affect the adherence and spread of ink, and thus its appearance, on the substrate.
c. printing plate properties, such as:
   plate material (e.g. hardness, resilience, surface finish)
   plate preparation processes, which can affect the properties of the plate material as well as process the plate to define the image to be printed (e.g. in flexography, by removal of plate material to define the relief portions defining the image)
   plate backing or mounting material (e.g. the hardness and resilience of a particular "sticky back" mounting material to be used)
   which can all affect adherence of ink to the printing plate and/or ink release from the plate and/or the ability to transfer ink to the substrate.
d. ink application system properties, such as:
   analox roller selection (e.g. line screen and ink volume)
   doctor blade selection and settings
   which can all affect the amount of ink applied to the printing plate and thus the amount of ink ultimately transferred to the substrate.
e. printing processes, such as:
   press speed (which affects ink drying time between the application of ink colours and contact time between plate and substrate thus affecting the amount of ink transferred)
   printing plate pressure (which affects the amount of ink transferred to the substrate).

In addition to the above, errors of all types, including failure to maintain good housekeeping practices, may lead to unintended contamination of ink or substrate or improper application of ink to substrate.

The proper selection of materials, equipment and settings will result in a print run in which the ink on the finished printed product will have satisfactory properties, such as:
   ink colour (i.e. satisfactory spectral measurement in either LAB or LCH)
   colour density (i.e. satisfactory ink film thickness)
   dot gain (i.e. satisfactory ink dot width after taking into account the percentage increase or decrease, i.e. "gain", of an ink dot from printing plate to final printed product) and
   gray balance (i.e. satisfactory layering of ink film colours).

Provided that the print variables are carefully controlled for a particular printing press, it should be possible for a printing press to deliver consistent products over time, or from print run to print run or even from job to job. To assist in controlling press performance, it is known to require a press to print a calibration image under production conditions. When the printed calibration image is satisfactory, the values for all of the print variables are recorded in what is known as a press "fingerprint". In the event that a future print from the same press appears not to be satisfactory, the fingerprint will be available as a standard against which the values of the print variables at the time of the future print may be compared. In this way, a measured assessment may be made as to whether and which and by how much any print variables may have changed, so that appropriate corrective action may be taken.

The standard against which a particular printed product is assessed is a hard copy document known as a "contract proof". This document has been approved by both the customer and the commercial printer as representing the visual standard which the printed products must match as closely as possible. In current printing practice, contract proofs are prepared from electronic files of the artwork to be printed by a machine known as a dot proofer, for example as sold under the trademarks LATRAN PREDICTION or KODAK APPROVAL. A dot proofer prints the image to be printed on the press by simulating printed ink dots at an appropriate resolution on a carrier sheet and then applies this image to the relevant substrate. The result is a prototype document which the printing press should be able to match. The final version of the electronic file from which the contract proof was printed is sometimes known as an "electronic soft proof".

In current practice, printing plates are prepared by, or supplied to a commercial printer, along with the contract proof. The printer will set up its printing press in a manner which the printer believes will yield a printed product which will closely match the contract proof. Setting-up a printing press is an iterative process, wherein the printer will adjust at least some of the variables mentioned above to arrive at a printed product which the printer believes does match the contract proof.

Before proceeding with a print run, a printer will require the customer to authorize the print run to proceed. In this authorization process, the customer's representative will be supplied with a sample of the printed product printed by the printing press under production conditions. The customer visually compares this physical specimen, known as a "press pull", to the physical contract proof. If the press pull appears to match the contract proof in all significant respects, the customer's representative will approve the press run to proceed.

If the customer's representative believes that the press pull differs in significant respects from the contract proof, then the printer will be required to adjust the printing variables further and run another press pull. The process will be repeated until the customer's representative is satisfied.

Given the size and commercial value of commercial print runs, often producing tens of thousands or more printed products, it is crucial that these initial approval processes are to the satisfaction to all participants. Accordingly, the importance of the approval process cannot be overstated. As a result, it is common for a representative of a customer to attend at the premises of the printer for this approval process. As printers and customers alike may be located anywhere in the world, significant amounts of travel (with attendant costs, lost time performing other duties, inconvenience, risk, etc) can be involved in effectively concluding these necessary approval processes.

In addition, it will be appreciated that the visual assessment of a press pull as compared to a contract proof can involve an element of subjectivity. The individual responsible for making that subjective assessment thus faces a huge responsibility to ensure that his or her decision as to the satisfactory nature of the press pull is a sound one. Because of the need to be physically present for the approval process, only a limited number of customer representatives (often only one or two) are involved in the approval process—in spite of the fact that preferably more persons should be involved so as to reduce dependence on the subjective nature of the assessment.

A large print run can require a significant amount of time. In many cases, the customer's representative(s) will not stay on the premises of the printer for the entire print run, Over the course of a long print run, it is possible, if not likely, that one or more printing variables may change. It is not uncommon to find that the last printed product in a long print run looks significantly different from the original press pull and the contract proof. The slow degradation of the printing process as compared to the contract proof can be problematic. A printer itself may remove representative specimens as they are printed (i.e. take additional press pulls) and make comparisons to the contract proof. However, the printer's assessment of the printed product may not be as critical as the customer's assessment. Thus, failure to monitor printing processes throughout the print run can lead to disputes between a customer and a printer.

In an effort to address some of the above problems in a convenient if not entirely trustworthy or accurate manner, some persons will compare a press pull against the electronic soft proof displayed on a video monitor. The problem of course is that video monitors do not necessarily accurately or consistently display colour and such comparisons can be unreliable. Attempts have been made to make such a process more reliable by ensuring that the video monitor has been calibrated to an industry standard. Nevertheless, it can still be difficult to effectively compare a hard copy press pull against the electronic soft proof (which is not the actual defined standard) on a video screen.

The present invention provides a proofing system and method for analyzing the colour quality of a printed product as compared to a contract proof, which can be used by a printer to more conveniently yet reliably monitor the progress of a print run and by a customer to remotely yet reliably approve initiation of a print run and, if desired, monitor same on a regular or ongoing basis.

SUMMARY OF THE INVENTION

The present invention provides a system for comparing the colour of a printed product to a contract proof comprising at least one scanner for scanning the contract proof to create image data including colour data representing a scanned proof image and for scanning the press pull to create image data including colour data representing a scanned press pull image, an image comparator connected to the at least one scanner to receive the data for the scanned proof image and the scanned press pull image, a video monitor connected to the image comparator to receive the data for the scanned proof image and the scanned press pull image and to display the scanned images simultaneously.

In another aspect, the invention provides a method for comparing the colour of a printed product to a contract proof comprising the steps of scanning the contract proof to create image data including colour data representing a scanned proof image, scanning the press pull to create image data including colour data representing a scanned press pull image, displaying the scanned images simultaneously on a video monitor, and, identifying in the displayed images any significant differences in colour.

In yet a further aspect, the invention provides a method of printing colour products on a colour printing press, which has associated with a certain press fingerprint comprised of the values for all relevant print variables under press operating conditions, in a print run associated with a contract proof, the method comprising the steps of: scanning the contract proof to create image data including colour data representing a scanned proof image; removing a sample printed colour product from the press; scanning the printed colour product to create image data including colour data representing a scanned press pull image; displaying the scanned images simultaneously on a video monitor; aligning and linking the scanned images; automatically comparing the colour data for each section of one image with the colour data for a linked corresponding section of the other image to determine whether any differences exceed a pre-determined threshold and maintaining a count indicative of the number of sections which are determined to exceed such threshold; determining whether the number of sections which exceed such threshold exceeds a pre-determined overall threshold to determine colour quality; if the overall threshold is not exceeded, continuing with the print run; if the overall threshold is exceeded, temporarily stopping the print run, adjusting the print variables, resuming the print run, and repeating the above from the removing sample step until the print run is complete.

BRIEF DESCRIPTION OF THE DRAWINGS

Preferred embodiments of the present invention are illustrated in the attached drawings, in which:

FIG. 4 is a block diagram of a further embodiment of the print colour analysis system according to the invention;

FIG. 5 is a block diagram of a further embodiment of the print colour analysis system according to the invention;

DETAILED DESCRIPTION OF THE PREFERRED EMBODIMENTS

Figure 1:
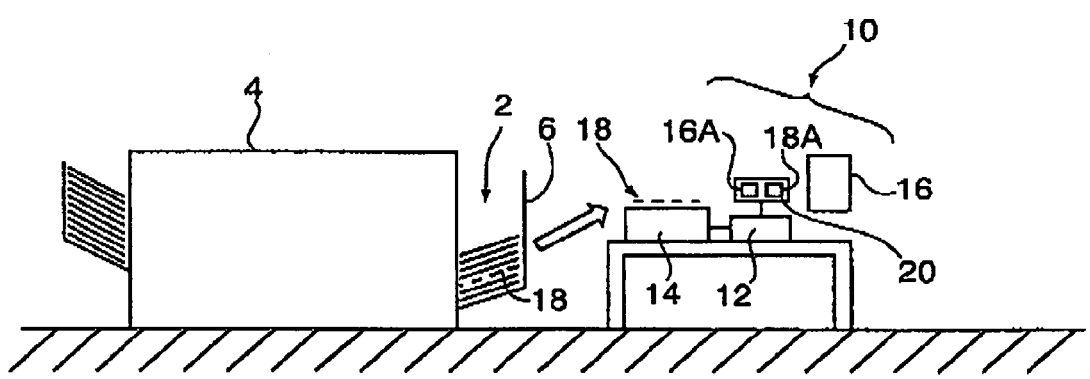
FIG. 1 is a schematic diagram of a print colour analysis system according to the invention.
Figure 2:
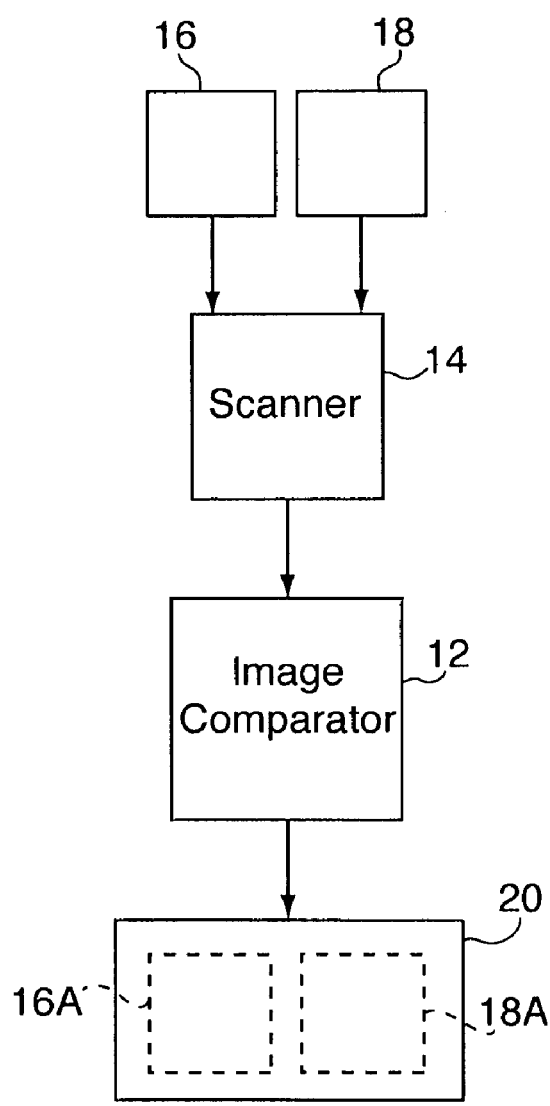
FIG. 2 is a block diagram of a print colour analysis system according to the invention.

Referring to FIGS. 1 and 2, there is generally shown a system 10 for analyzing colour of printed products according to the invention. Colour analysis system 10 will assist an inspector (not shown) to assess the quality of the colours of printed products 2 produced by colour printing press 4 at its output tray or bin 6. Printing press 4 has associated with it a pre-determined press "fingerprint", representing the selections and settings for all relevant print variables under operating conditions anticipated for the particular print run.

The assessment of colour quality is made by comparing a sample printed product 2 against a contract proof 16 already approved by all relevant parties. More particularly, full-colour press pull 18 (shown as a dashed line), which could be the first specimen or a random specimen printed product anywhere in the press run, is taken from output bin 6 and moved over to system 10 for processing and evaluation, as described below, in comparison to the contract proof 16.

System 10 comprises image comparator 12 connected to, or otherwise adapted to receive signals or data from, a high resolution, high-fidelity colour scanner 14. Comparator 12 may comprise a general purpose computer, programmed appropriately or a dedicated comparator device.

Scanner 14 should be of high quality so that its scans can be relied upon to be consistent and with minimal risk of calibration drift. For a particular printing job, scanner 14 is of a sufficient physical size to be able to scan both the contract proof 16 and one or more press pulls 18. An example of a suitable scanner for use in commercial printing and in the present application is the SMARTLF GX25™ scanner by Colortrac. Most preferably, contract proof 16 and press pull 18 will be simultaneously scanned together by scanner 14, which will minimize the chance for any difference in scanner calibration to occur. Alternatively, but next in preference, contract proof 16 and press pull 18 could be scanned immediately one after the other by the same scanner 14. In the further alternative, but next again in preference, contract proof 16 and press pull 18 could be scanned by the same scanner 14 within such a time period that significant colour calibration drift of scanner 14 would not have occurred. As possible but least favoured alternative, contract proof 16 and press pull 18 could be scanned by different scanners or even by the same scanner 14 but separated in time such that significant colour calibration drift of scanner 14 could have occurred; in either such alternative, significant effort should be made to ensure that the scanners are duly colour calibrated, so that their outputs may be meaningfully compared, before making or relying on the two separate scans.

Scanner 14 works in generally conventional manner to make high resolution scans of contract proof 16 and press pull 18 and, using or in conjunction with suitable drivers (not shown), to deliver image data in any desirable image format, such as for example in high quality .jpg format. In known manner, the data supplied by scanner 14 will include all data necessary for reconstruction of the scanned image at the specified resolution. For each pixel in the image, the scanner will determine all relevant data, such as in the case of the .jpg format the red-green-blue, or RGB, content of the image. If the format selected will compress data, preferably any such compression will be lossless or otherwise colour data may be compromised or even lost and comparisons rendered less reliable.

Image comparator 12 is also connected to an output device, namely video monitor 20, whereby the .jpg images of the scanned contract proof 16 and press pull 18 may be displayed. For the purposes of the present invention, video monitor 20 requires no particular calibration before or after receiving output from image comparator 12. Thus, the colour of the on-screen images displayed on monitor 20 may not match the colour of either the contract proof 16 and press pull 18. However, a particular user may prefer his or her video monitor 20 to be calibrated for the particular scanner 14 used (so that the colour on monitor 20 will more closely match the colour as rendered by scanner 14) and/or in accordance with printing industry standards, such as the Standard Web Offset Publication, known as SWOP, standard established by the offset printing industry (so that the colours of the on-screen images displayed on monitor 20 may more closely match the colours as rendered by the printing press 4 in press pull 18).

Figure 3:
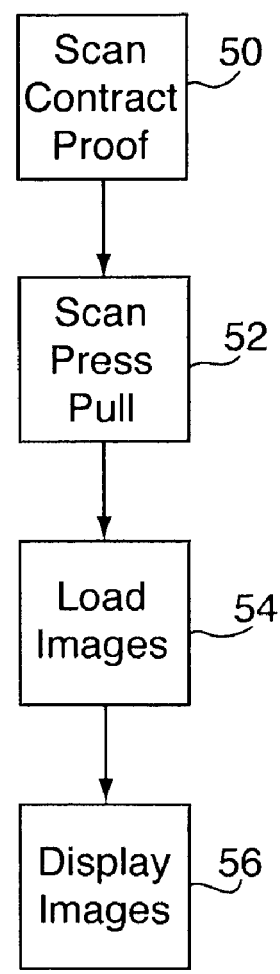
FIG. 3 is a flow chart of the method of analyzing print colour according to the invention.

Referring to FIG. 3, the basic operation of system 10 is illustrated. In a first step 50, scanner 14 scans the contract proof 16. In a related optional step (not shown), conventional tools, such as spectral densitometers, may be used to take accurate and independent precise colour and density measurements from the contract proof 16 and this data may be associated with the data generated by scanner 14 in the scan of contract proof 16 and ultimately made available to any user.

In a second step 52, scanner 14 scans the press pull 18. In a related optional step (not shown), conventional tools, again such as spectral densitometers, may be used to take accurate and independent precise colour and density measurements from the press pull 18 and this data may be associated with the data generated by scanner 14 in the scan of press pull 18 and ultimately made available to any user.

In a third step 54, the data, e.g. in .jpg format, corresponding to the scanned images of contract proof 16 and press pull 18 are loaded into image comparator 12. In a display step 56, image comparator 12 outputs the data for both scanned images to video monitor 20 whereby to display, simultaneously and preferably side by side, image 16A of proof 16 and image 18A of press pull 18. Because the two images 16A and 18A have been scanned on scanner 14 in calibrated manner via one of the methods described above and are presented at the same time on the same video monitor for direct comparison to each other (and not to some other physical object or standard), there is no need to be concerned about the absolute calibration of the video monitor to any real world printed object or printing process.

The basic system 10 described above may, without further enhancement, be usefully put into practice by a user. Given that the relevant parties have already approved the contract proof 16, the only requirement is to determine whether press pull 18 differs in any significant respect from contract proof 16. In addition, given that the scanning process generates highly reliable and consistent electronic data, the differences between contract proof 16 and press pull 18 may be assessed by examining the scans thereof and not the physical originals. In short, the user need only assess the images 16A and 18A for differences between them. Moreover, the video monitor 20 need not be calibrated as comparison to some absolute physical standard is no longer required.

The ability to perform the necessary comparison between contract proof 16 and press pull 18 based on electronic data, rather than on physical specimens, now allows for the possibility of performing the approval process remotely. For example, referring to FIG. 4, the scanner 14 may be located remotely from the image comparator 12. The scanned data for both the contract proof 16 and the press pull 18 may be delivered to the comparator 12 by any appropriate means 22 for delivering electronic data, such as various telecommunication media (e.g. the internet, direct dial, e-mail) or even by physical delivery of removable media (e.g. CD-ROMs, DVDs, diskettes, USB memory devices and the like). A remote user at video monitor 20 inputs the scanned data to image comparator 12 and visually searches the images 16A and 18A displayed on monitor 20 for any colour differences and, if any differences are noted, evaluates the significance thereof. If necessary, the user can communicate the results of his or her evaluation by conventional means back to the printer where scanner 14 is located.

In preferred embodiments, the capability and usefulness of system 10 will be greatly enhanced by the addition of certain features, as described below.

Referring to FIG. 5, an input device 24 (such as a mouse, touchscreen or touchpad) is provided to allow the user to move a cursor to different positions in images 16A and 18A and to select different pixels or groups of pixels therein. In response to such user input, image comparator 12 will display the underlying RBG data for the selected pixel (or, if a group of pixels is selected, an average of the RGB data for all of the pixels). In this manner, a user can access and compare hard data associated with any portion of images 16A or 18A to assist in determining whether there are significant differences between them.

Figure 6:
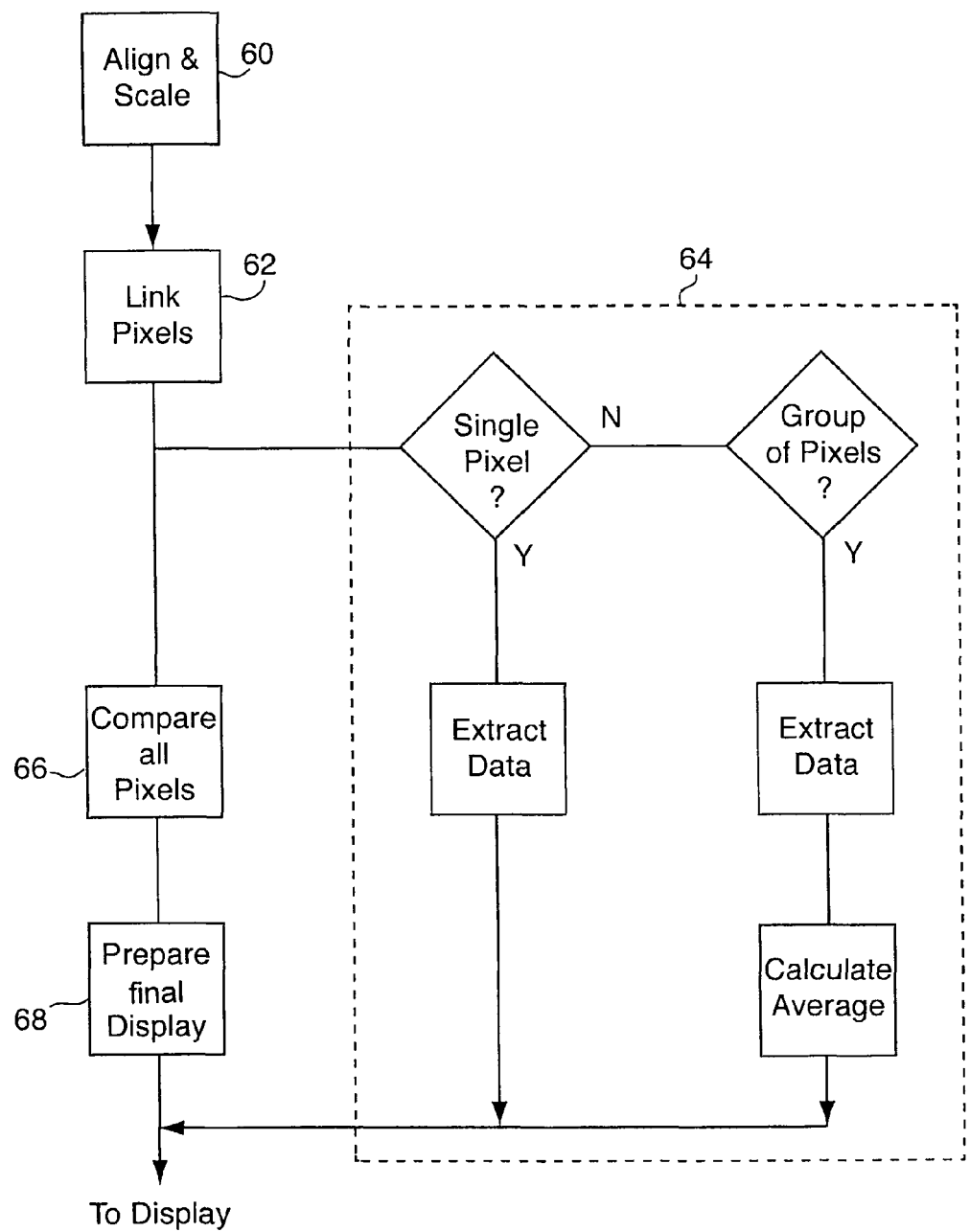
FIG. 6 is a flow chart showing the general steps in the operation of an image comparator in accordance with the invention.

As another enhancement, referring to FIG. 6, in a preliminary processing step 60, image comparator 12 preferably automatically checks, and adjusts as necessary, the alignment and scale of images 16A and 18A so that there is a one-to-one correspondence between the pixels in the images. In addition, in a linking step 62, image comparator 12 links together corresponding pixels in images 16A and 18A, so that when input device 24 selects one or more pixels in either image 16A or 18A the corresponding one or more pixels in the other image 18A or 16A, as the case may be, are also identified. Pixels in the two images 16A and 18A are thus linked into pairs. In a pixel data display step 64, the underlying RGB data for a selected pixel (or average of the data for a selected group of pixels) in one image 16A or 18A can be extracted along with data for the corresponding pixel (or average of the data for the corresponding group of pixels) extracted from the other image 18A or 16A as the case may be and displayed. In this manner, the user is conveniently presented with the data from both images 16A and 18A for any pixel or pixels of interest, so that comparisons may be more easily made.

As another enhancement, also referring to FIG. 6, in a comparison step 66, image comparator 12 preferably automatically compares the data for each pixel in image 16A with the data for each corresponding pixel in image 18A. In a final report display step 68, the results of the automatic comparison can be presented in a report to the user displayed on monitor 20 or other output device 26 (e.g. a printer). In this manner, any portions of images 16A and 18A which differ significantly can be highlighted or otherwise identified for more careful evaluation by the user.

Moreover, in a particularly useful embodiment, image comparator 12 automatically summarizes the results of the automatic comparison by presenting an evaluation (based on criteria specified in advance by the user or otherwise pre-determined) as to whether the data for image 18A are satisfactory or not as compared to the data for image 16A—in essence, a preliminary "pass/fail" or "green light-yellow light-red light" evaluation of press pull 18. For example, the pre-determined criteria could be structured as follows:

if the data for x % of the pixels in image 18A are within X % of the corresponding pixels in image 16A, then image comparator 12 will report a "pass" or "green light" evaluation, indicating a preliminary pass if the data for z % of the pixels in image 18A exceed Z % of the corresponding pixels in image 16A, then image comparator 12 will report a "fail" or "red light" evaluation, indicating a preliminary failure if the data do not meet either of the preceding conditions, then image comparator will report a "yellow light", indicating caution and further assessment may be needed.

Figure 7:
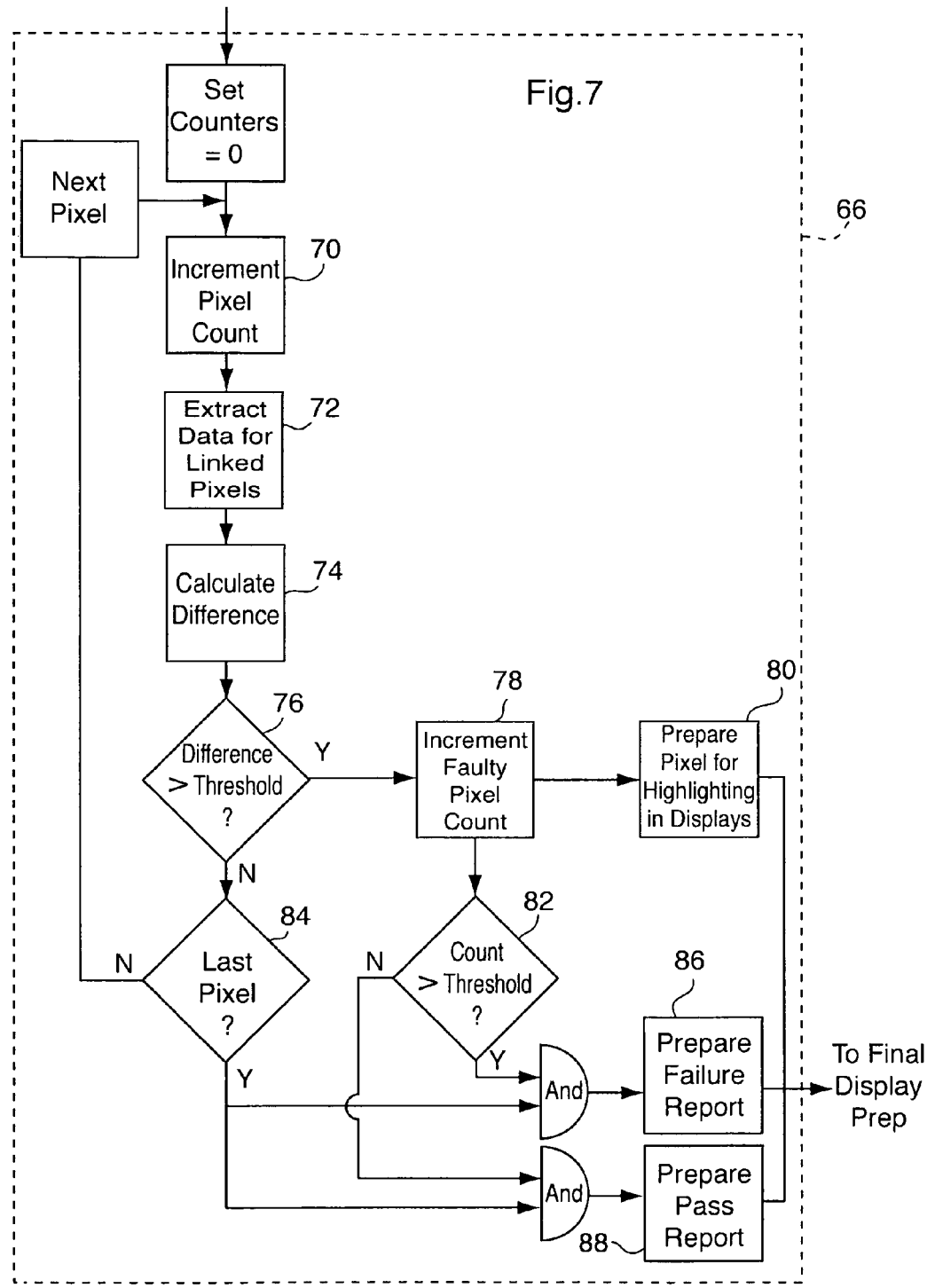
FIG. 7 is a flow chart showing the steps in the automatic analysis of scans of the contract proof and press pull by an image comparator in accordance with the invention.

Referring to FIG. 7, image comparator 12 automatically cycles through all of the pairs of linked pixels in images 16A and 18A counting the number of pixels where the data exceeds a certain threshold. More specifically, the number of pixels is counted in a counting step 70. For each pair of linked pixels, the relevant data (e.g. the RGB data) is extracted in extraction step 72 and the difference therebetween calculated in calculation step 74. In a faulty pixel test step 76, the difference is tested to determine whether it exceeds a pre-determined threshold. If it does exceed the threshold, the pixel is added to a count of faulty pixels in counting step 78. In a report preparation step 80, data identifying the faulty pixel may be prepared so that it can be highlighted in the display of images 16A and/or 18A on video monitor 20. In a faulty pixels count test 82, the count of faulty pixels is compared to a pre-determined threshold.

In the faulty pixel test step 76, if the difference is determined not to exceed the threshold, a check is made in last pixel test step 84 to determine whether the pixel is the last pixel in images 16A and 18A. If not, image comparator 12 moves to the next pixel pair. If it is the last pixel in images 16A and 18A and the count of faulty pixels exceeds the pre-determined threshold, then a failure report will be prepared in a failure report preparation step 86. If it is the last pixel in images 16A and 18A and the count of faulty pixels does not exceed the pre-determined threshold, then a pass report will be prepared in a pass report preparation step 88.

In other embodiments, multiple thresholds could be used to determine other levels of success, such as in a three-level "green light-yellow light-red light" evaluation.

In operation, press pull 18 is removed from output bin 6 of printer 4. Contract proof 16 is scanned on scanner 14 and delivered by any suitable means, as described above, to image comparator 12. Press pull 18 is similarly scanned on scanner 14 and likewise delivered by any suitable means to image comparator 12. Image comparator 12 displays images 16A and 18A of the contract proof 16 and the press pull 18 on video monitor 20. The operator may immediately examine images 16A and 18A for differences therebetween, without regard to whether monitor 20 is calibrated to any physical standard.

In addition, comparator 12 may, in response to user input from input device 24, deliver data, via video monitor 20 or other suitable output device 26, to the user regarding the underlying colour data, such as RGB data, relevant to any particular selected pixel or group of selected pixels. In the case of a group of selected pixels, the data presented to the user will be averaged from the data for the underlying individual pixels.

In addition, image comparator 12 will preferably automatically compare the underlying data for pixels underlying image 18A with corresponding pixels underlying image 16A. To effect this purpose, image comparator 12 must first, in step 60, align and scale images 16A and 18A so that there is a one-to-one correspondence between the pixels thereof. By doing so, image comparator 62 may link together corresponding pixels in image 16A and 18A. Image comparator 12 now cycles through all of the pairs of linked pixels, keeping a count of the number of pixels in step 70, extracting the data for the pairs of linked pixels in step 72, calculating the difference therebetween in step 74, testing in step 76 whether any such difference exceeds a predetermined threshold (thus representing a faulty pixel) and, if it does, keeping a count of the number of faulty pixels in step 78. When the last pixel has been tested in step 76, the total count of faulty pixels is compared to a predetermined threshold in step 82 and, if the threshold is exceeded, a "failure" report is prepared in step 86. If it does not exceed the threshold, then a "pass" report is prepared in step 88. In addition, in step 80, faulty pixels can be prepared for identification, e.g. by highlighting or some other report, on video monitor 20 or other output device 26.

With the automated evaluation by image comparator 12, as described above, both the printer and the customer will have a preliminary assessment as to whether a press pull 18 is within specification as compared to contract proof 16. Of course, either the customer or the printer may choose to undertake their own further and perhaps more detailed evaluation, if necessary or desired.

The system for, and method of, automatic evaluation referred to above may be particularly useful during a long print run. Periodically, press pulls may be taken from the printed product output bin 6, scanned in scanner 14 and compared as described above by image comparator 12 to the previously scammed contract proof 16. The printer may perform this evaluation for his own internal quality assurance purposes and the customer may or may not have access to these mid-run press pulls. In the event that the automatic evaluation by image comparator 12 provides a "pass" or "green light" evaluation, the press run will continue without adjustment. If however, the evaluation returns a "fail" or a "red light" evaluation, the print run may be temporarily halted. A more careful analysis of the press pull may be undertaken by the printer. For example, using conventional tools, such as spectral densitometers, very precise colour and density measurements can be taken from the press pull and compared to corresponding measurements on the contract proof. In the event that significant differences are detected, then the data and the then values of the printing variables can be reviewed and double-checked against the original press fingerprint. In this manner, the values for the appropriate press variables can be adjusted to return the printed product back into compliance with the contract proof. Once the necessary adjustments have been made, the press run can continue.

In some variations of the system and method described above, the automatic evaluation may not necessarily be to the pixel level of the images. In particular, it is possible that an image could be divided into groups of pixels, such as in a square or rectangular grid pattern with each cell of the grid covering a number of pixels. In such a system or method, the colour data for the underlying pixels in each cell will be averaged together to provide an averaged value for the cell. In performing an automatic evaluation, the averaged data for each grid cell will be used rather than the raw data for each underlying pixel.

In a further embodiment of the inventive system and method, a user may be provided with analytical tools to focus on analysis of portions of the relevant images. For example, it is often the case that not every portion of an image or printed product will be of equal importance to the user. For instance, the color rendition of a corporate logo may be of critical importance whereas the colour rendition of certain text may be of much less importance. In such cases, the user may wish to focus on comparisons of the colour content just of the important portions of the images. In fact, in some such embodiments, the user may not require the evaluation of the overall images 16A and 18A as described above, preferring instead to focus just on important portions of the images.

Figure 8:
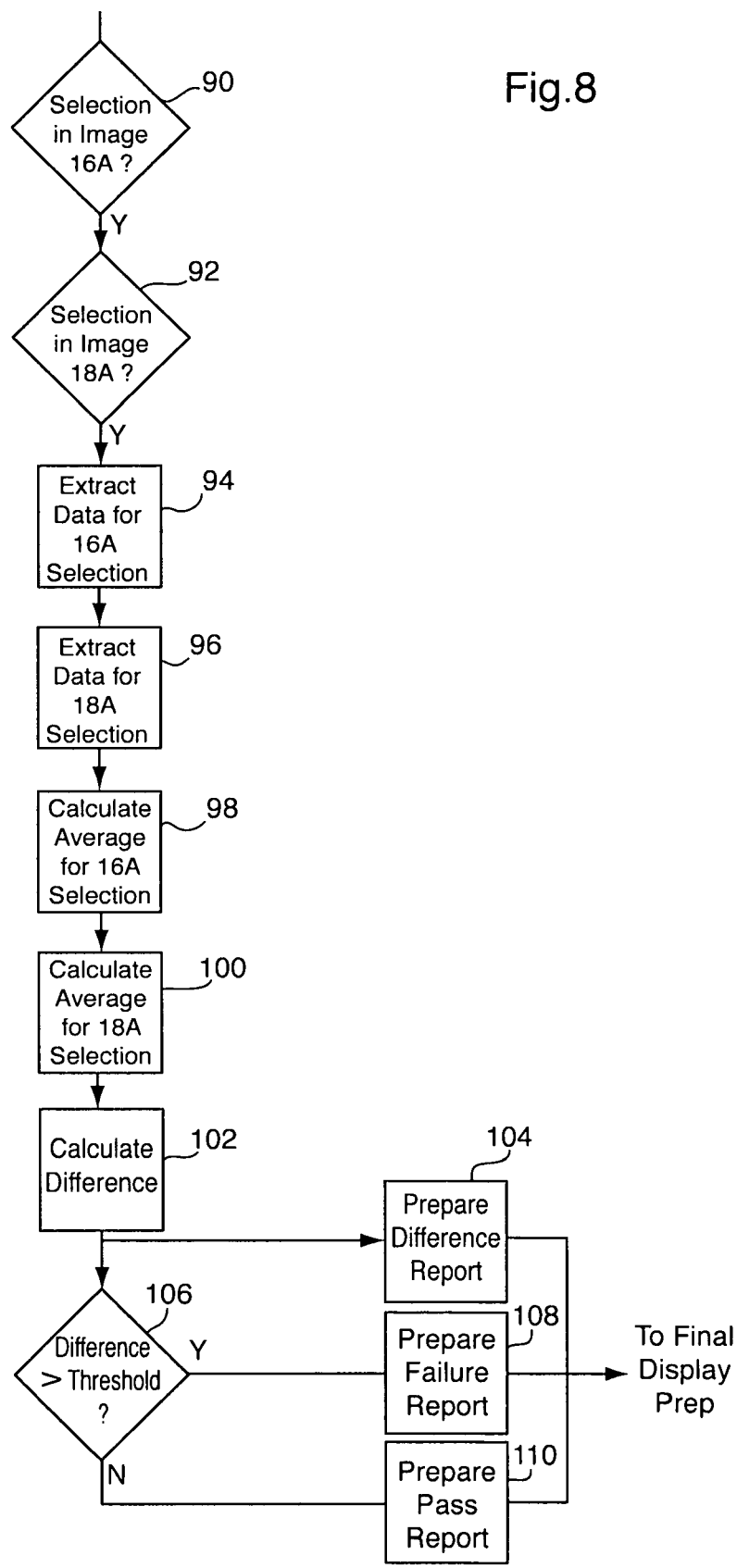
FIG. 8 is a flow chart showing the steps in the evaluation of portions of scans of the contract proof and press pull by an image comparator in accordance with the invention.

To enable functionality focussed just on portions of the images, input device 24 is used to select a portion of image 16A and a corresponding portion of image 18A. Preferably, when images 16A and 18A are aligned and linked, use of input device 24 to select of a portion of one image will automatically result in selection of a corresponding portion of the other image. With portions of each image selected, image comparator 12 automatically evaluates the average colour content of each selected portion and compares them. More specifically, referring to FIG. 8, in a portion-of-proof-image selection test step 90, image comparator 12 tests whether a selection of a portion of image 16A has been made. In addition, in a similar portion-of-press-pull-image selection test step 90, image comparator 12 tests whether a selection of a portion of image 18A has been made. If selections have been made in both, for each selection, the relevant data (e.g. the RGB data) for the underlying pixels within the selected ranges are extracted in data extraction steps 94 and 96 in respect of images 16A and 18A respectively. In addition, in averaging steps 98 and 100, an average value for the extracted data is calculated for each of the selected portions of images 16A and 18A respectively. Next, in calculation step 102, the difference between the average values for the two selected portions of images 16A and 18A is calculated. In step 104, the calculated difference can be prepared for inclusion in a report to be displayed to the user on monitor 20 or other output device 26. In a colour difference test step 106, the calculated difference is tested to determine whether it exceeds a predetermined threshold. If the threshold is exceeded, a "failure" report is prepared in step 108. If it does not exceed the threshold, then a "pass" report is prepared in step 110.

Figure 9:
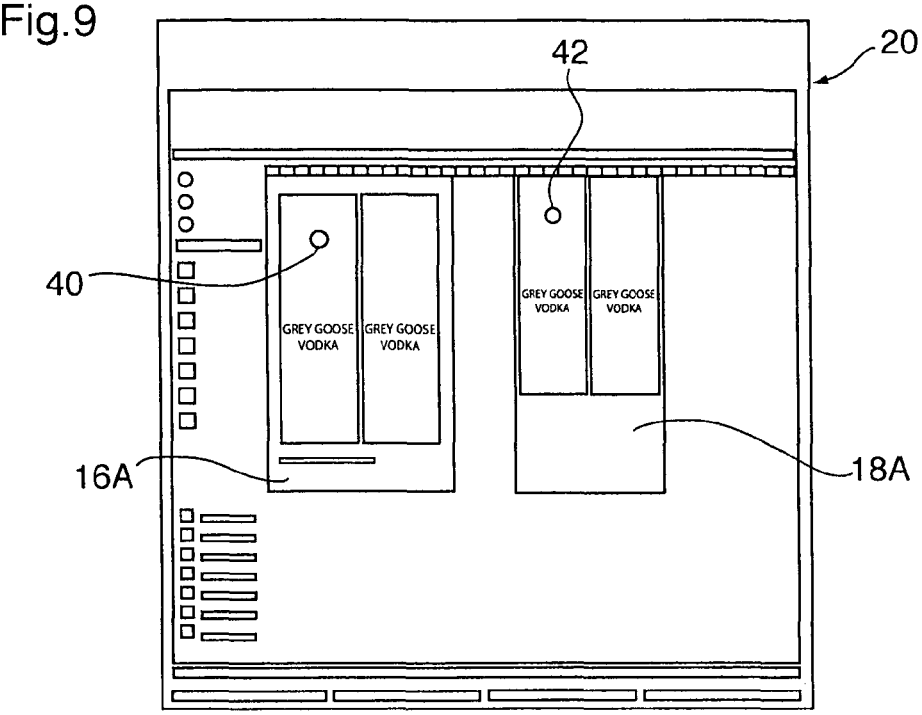
FIG. 9 is a screen shot of scans of the contract proof and press pull as presented to the user by an image comparator in accordance with the invention.
Figure 10:
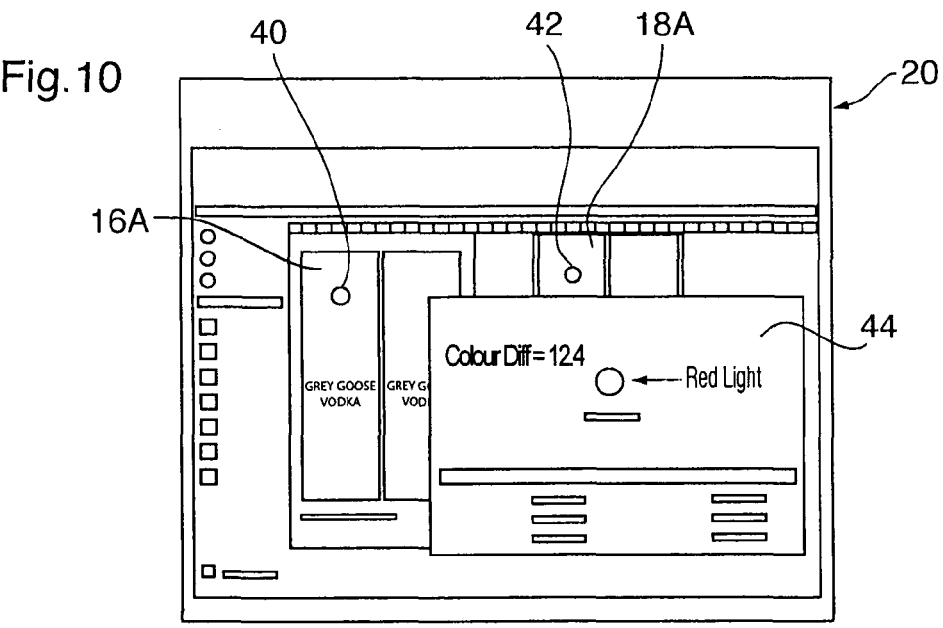
FIG. 10 is a screen shot of a report to a user as presented to the user by an image comparator in accordance with the invention.

In operation, referring to FIGS. 9 and 10, the user is presented with the images 16A and 18A on video monitor 20. Using the input device 26, the user makes a selection 40 of a portion of image 16A. A selection 42 of a corresponding portion of image 18A is also identified and selected. In accordance with the steps described above, the colour data for the selected portions 40 and 42 are extracted and averaged and the difference is calculated. The difference, in the example identified as a "colour diff", is presented numerically to the user in a report 44. In accordance with the steps described above, the difference is compared to a threshold and in the illustrated example report 44 indicates failure (indicated by the presence of a "red light"). Pass reports for all areas of importance or interest indicates that the press run can be approved to proceed. Failure in one or more important areas indicates that the print variables need adjustment.

Although automatic linking of selections of the portions of the images to be compared (achieved through the alignment and linking of images 16A and 18A) has been described above, it will be appreciated that such automatic linking of selections is not a necessity. In some embodiments, a user may manually select the portions of both images 16A and 18A for evaluation according to the steps described above. Although not as precise as automatic selection, given the averaging processes that take place as described, manual selection can be effective and may be useful in a more economic embodiment of the invention.

In some embodiments of the invention where a user does not need, and indeed may prefer not to have, the automatic evaluation of the overall images 16A and 18A, preferring instead to focus just on important portions of the images, images 16A and 18A need not be aligned and linked. In such a case, the user will simply effect his selections of images 16A and 18A manually, as described above.

Although various preferred embodiments of the present invention have been described herein in detail, it will be appreciated by those skilled in the art, that variations and modifications may be made thereto without departing from the scope of the appended claims.

The embodiments of the invention in which an exclusive property or privilege is claimed are defined as follows:

1. A method for remotely approving a colour print job proposed to be run on a colour printing press at a first location, which print job is associated with a contract proof also located at the first location and which print job requires an approval decision from a user at a second location to proceed, comprising the steps of:
   at the first location, scanning the contract proof to create image data including colour data representing a scanned proof image,
   at the first location, scanning a press pull produced by the press to create image data including colour data representing a scanned press pull image, wherein said scanning steps are performed in a manner to render the scanned proof image and the scanned press pull image in colour calibration with each other,
   communicating the image data to the second location;
   displaying the scanned images simultaneously on a single, colour video monitor at the second location,
   conducting an analysis of the displayed images for any significant differences in colour and based on such analysis making an approval decision regarding the print job, and,
   communicating the approval decision from the second location to the first location.

2. The method of claim 1 wherein the scanning steps are performed simultaneously on a single scanner.

3. The method of claim 1 wherein the scanning steps are performed sequentially on a single scanner within a time period in which colour calibration of the scanner will not drift significantly.

4. The method of claim 1 wherein the analysis step includes the steps of:
   selecting corresponding portions of the scanned images,
   calculating an average for the colour data associated with said selected portions,
   calculating the difference between the averages, and,
   comparing the difference to a pre-determined threshold to determine colour quality.

5. The method of claim 1 wherein the images are divided into pre-determined sections and wherein the analysis step includes the steps of:
   aligning and linking the scanned images,
   automatically comparing the colour data for each section of one image with the colour data for a linked corresponding section of the other image to determine whether any differences exceed a pre-determined threshold and maintaining a count indicative of the number of sections which are determined to exceed such threshold, and
   determining whether the number of sections which exceed such threshold exceeds a pre-determined overall threshold to determine colour quality.

6. The method of claim 5 wherein the images are comprised of pixels and the sections are individual pixels.

7. The method of claim 5 wherein the images are comprised of pixels, the sections comprise groups of pixels and the colour data for a section is a calculated average of the colour data for the pixels in said section.

8. The method of claim 7 wherein the analysis step further includes the further additional steps of:
   selecting a portion of one of the scanned images,
   automatically selecting a corresponding portion of the other of the scanned images,
   calculating an average for the colour data associated with said selected portions,
   calculating the difference between the averages, and,
   comparing the difference to a pre-determined threshold to determine colour quality.

9. A system for remotely approving a colour print job proposed to be run on a colour printing press at a first location, which print job is associated with a contract proof also located at the first location and which print job requires an approval decision from a user at a second location to proceed, comprising:
   at least one imaging device at the first location for scanning the contract proof to create image data including colour data representing a scanned proof image and for scanning a press pull produced by the press to create image data including colour data representing a scanned press pull image,
   an image comparator operatively connected to the at least one imaging device to receive the image data for both the scanned proof image and the scanned press pull image and for outputting same to a second location for simultaneous display;
   a single, colour video monitor at the second location operatively connected to the image comparator to receive the image data for the scanned proof image and the scanned press pull image and to display the scanned images simultaneously for analysis of significant colour differences and the making of an approval decision based thereon; and,
   communication means between the first and second locations whereby the approval decision may be communicated from the second location to the first location.

10. A system as claimed in claim 9 wherein the system further comprises an input device at the second location whereby the user may select corresponding portions of the scanned images and wherein the comparator is operable to calculate an average for the colour data associated with said selected portions, to calculate the difference between the averages, and, to compare the difference to a pre-determined threshold to determine colour quality.

11. A system as claimed in claim 9 wherein the images are divided into pre-determined sections and the comparator is operable to align and link the scanned images, to automatically compare the colour data for each section of one image with the colour data for a linked corresponding section of the other image to determine whether any differences exceed a pre-determined threshold and to maintain a count indicative of the number of sections which are determined to exceed such threshold, and, to determine whether the number of sections which exceed such threshold exceeds a pre-determined overall threshold to determine colour quality.

12. A system as claimed in claim 11 wherein the comparator is operable to receive information identifying user selection of a portion of one of the scanned images, to automatically select a corresponding portion of the other of the scanned images, to calculate an average for the colour data associated with said selected portions, to calculate the difference between the averages, and, to compare the difference to a pre-determined threshold to determine colour quality.

13. An image comparator apparatus for facilitating the remote approval of a colour print job proposed to be run on a colour printing press at a first location, which print job is associated with a contract proof also located at the first location and which print job requires an approval decision from a user at a second location to proceed, comprising;
- means to receive image data including colour data derived from at least one imaging device at the first location from a scan of a press pull produced by the press and from a scan of the contract proof, representing respectively a scanned press pull image and a scanned proof image; and,
- means to output said image data to a video monitor at the second location for simultaneous display of the scanned images for analytical purposes.

14. An apparatus as claimed in claim 13 wherein the apparatus further comprises means to receive user input from an input device at the second location as to user selection of corresponding portions of the scanned images and means to calculate an average for the colour data associated with said selected portions, to calculate the difference between the averages, and, to compare the difference to a pre-determined threshold to determine colour quality.

15. An apparatus as claimed in claim 13 wherein the images are divided into pre-determined sections and the apparatus further comprises means to align and link the scanned images, to automatically compare the colour data for each section of one image with the colour data for a linked corresponding section of the other image to determine whether any differences exceed a pre-determined threshold and to maintain a count indicative of the number of sections which are determined to exceed such threshold, and, to determine whether the number of sections which exceed such threshold exceeds a pre-determined overall threshold to determine colour quality.

16. An apparatus as claimed in claim 15 wherein the apparatus further comprises means to receive information identifying user selection of a portion of one of the scanned images, to automatically select a corresponding portion of the other of the scanned images, to calculate an average for the colour data associated with said selected portions, to calculate the difference between the averages, and, to compare the difference to a pre-determined threshold to determine colour quality.

* * * * *